(12) United States Patent
Garnreiter

(10) Patent No.: US 7,918,070 B2
(45) Date of Patent: Apr. 5, 2011

(54) DEVICE AND METHOD FOR SEALING PACKAGES

(75) Inventor: Franz Garnreiter, Bruckmühl (DE)

(73) Assignee: Linde Aktiengesellschaft, Munich (DE)

( * ) Notice: Subject to any disclaimer, the term of this patent is extended or adjusted under 35 U.S.C. 154(b) by 149 days.

(21) Appl. No.: 11/991,523

(22) PCT Filed: Sep. 5, 2006

(86) PCT No.: PCT/EP2006/008646
§ 371 (c)(1),
(2), (4) Date: Dec. 31, 2008

(87) PCT Pub. No.: WO2007/031215
PCT Pub. Date: Mar. 22, 2007

(65) Prior Publication Data
US 2009/0229223 A1     Sep. 17, 2009

(30) Foreign Application Priority Data

Sep. 14, 2005 (DE) .......................... 10 2005 043 779

(51) Int. Cl.
*B65B 31/02* (2006.01)
(52) U.S. Cl. ................. 53/432; 53/477; 53/479; 53/510
(58) Field of Classification Search .................... 53/432, 53/434, 477, 479, 510–512
See application file for complete search history.

(56) References Cited

U.S. PATENT DOCUMENTS

| | | | | |
|---|---|---|---|---|
| 3,652,818 A | * | 3/1972 | Erlandson et al. | 219/72 |
| 3,719,017 A | | 3/1973 | Shapiro et al. | |
| 4,885,897 A | | 12/1989 | Gryouda et al. | |
| 5,271,207 A | * | 12/1993 | Epstein et al. | 53/432 |
| 5,885,640 A | * | 3/1999 | Andersson | 426/316 |
| 6,078,031 A | * | 6/2000 | Bliault et al. | 219/607 |
| 7,600,358 B2 | * | 10/2009 | Natterer | 53/432 |

FOREIGN PATENT DOCUMENTS

| | | |
|---|---|---|
| EP | 0214372 A1 | 3/1987 |
| EP | 0360194 A2 | 3/1990 |
| EP | 0469296 A1 | 2/1992 |
| EP | 0483569 A1 | 5/1992 |
| GB | 551271 A | 2/1943 |
| GB | 616789 A | 1/1949 |
| GB | 2089191 A | 6/1982 |
| JP | 08-136769 | * 5/1996 |

* cited by examiner

*Primary Examiner* — Hemant M Desai
(74) *Attorney, Agent, or Firm* — Joshua L. Cohen

(57) ABSTRACT

The invention pertains to a device and a method for sealing a package with a sealing seam by partially fusing together the packaging material, and a supply system for protective gas. The device includes a gas supply for inert gas and an inert gas outlet opening, wherein the gas supply for inert gas and the inert gas outlet opening are arranged such that an inert gas current resulting therebetween flows around the sealing seam during sealing of the package. The method provides a flow of inert gas around the sealing seam during sealing of the package.

7 Claims, No Drawings

DEVICE AND METHOD FOR SEALING PACKAGES

This application is 35 U.S.C. 371 of PCT Application PCT/EP2006/008646, filed Sep. 5, 2006, which claims priority to German Patent Application No. 10 2005 043 779.6, filed Sep. 14, 2005.

BACKGROUND OF THE INVENTION

The present invention pertains to a device and a method for sealing a package.

In order to seal packages containing a protective gas, it is known to utilize, e.g., so-called chamber machines. Such chamber machines usually feature a vacuum chamber that contains the package and from which air is removed in order to subsequently introduce the protective gas for gassing the product in the package. During the gassing process, the protective gas fills the entire vacuum chamber in conventional chamber machines. The sealing of the package is typically realized with a sealing machine that features a heating device for producing a sealing seam. However, this heating device represents a potential ignition source and may be the cause for the creation of flammable gases. For example, excessively long sealing times caused by an error in the time control of the heating device may result in the creation of flammable gases from the (plastic) material of the package and/or sealing device. If the protective gas used consists of a gas mixture containing oxygen, the flammable gases and the oxygen may form a highly explosive mixture that could be ignited by the exposed hot sealing wire of the heating device. Until now, this was the reason why the manufacturers of such devices prohibited the use of protective gas with an oxygen content that exceeds a defined value (usually >21%). In practical applications, however, there are numerous instances, e.g., in the food industry, in which the utilization of a protective gas with an oxygen content of more than 21% is particularly advantageous. In this case, the introduction of protective gas into the package serves for preserving and/or improving the appearance of the packaged product.

DETAILED DESCRIPTION OF THE INVENTION

The present invention is a device and a method for sealing a package which can also be safely used in connection with a protective gas that has an oxygen content in excess of 21%.

With respect to the device, another gas supply for inert gas and an inert gas outlet opening are provided, wherein the gas supply for inert gas and the inert gas outlet opening are arranged such that an inert gas current resulting therebetween flows around the sealing seam during the sealing process. This inert gas reliably prevents the protective gas from contacting the sealing seam and the sealing device. The risk of an explosive gas mixture being present at the sealing device therefore is eliminated. Consequently, it is possible to safely utilize protective gas with an oxygen content in excess of 21%. For example, nitrogen is particularly suitable for use as an inert gas.

The sealing device features a heating device that emits and transfers thermal energy into the packaging material in order to make it possible to partially fuse together the packaging material along a so-called sealing seam.

The sealing device features a heating wire suitable for the above-described purpose.

According to an alternative embodiment of the invention, a laser is provided for supplying the energy required for partially fusing together the packaging material. This makes it possible to partially fuse together the packaging material along a so-called sealing seam, wherein it is also necessary to flush the region of the sealing seam with inert gas because the energy supplied by the laser could serve as an ignition source for flammable gases created from the melting packaging material.

With respect to the method, an inert gas flows around the sealing seam during the sealing process. This results in the above-described advantages.

It is advantageous that the package is pressed against a heating device, particularly against a heating wire, wherein the package is closed by fusing together parts of the package that are pressed against one another.

In an alternative embodiment of the invention, the energy for partially fusing together the packaging material along a sealing seam is supplied with the aid of a laser and the package is closed by partially fusing together packaging material along the sealing seam. As described above, it is practical to flush the region of the sealing seam with inert gas during the sealing process so as to prevent the creation of an explosive gas mixture in the region of the sealing seam. Since the energy supplied by the laser could also serve as an ignition source, it is advisable to employ the same precautionary measures as in the embodiment that utilizes a heating wire.

It will be understood that the embodiments described herein are merely exemplary and that a person skilled in the art may make many variations and modifications without departing from the spirit and scope of the invention. All such variations and modifications are intended to be included within the scope of the invention as defined in the appended claims. It should be understood that the embodiments described above are not only in the alternative, but can be combined.

What is claimed is:

1. A method for sealing a package which accommodates a product with a sealing seam, comprising providing the package with an oxygen containing protective gas having an oxygen content greater than 21%; partially fusing together packaging material of the package along the sealing seam; and providing an inert gas to flow around the sealing seam during sealing of the package.

2. The method according to claim 1, wherein the inert gas comprises nitrogen.

3. The method according to claim 1, wherein the partially fusing comprises pressing the package against a heating device for fusing together parts of the package that are pressed against one another at the heating device.

4. The method according to claim 3, wherein the heating device comprises a heating wire.

5. The method according to claim 1, wherein the partially fusing comprises providing laser energy along the sealing seam for closing the packaging material along the sealing seam.

6. The method according to claim 1, wherein the providing the package with the oxygen containing protective gas comprises filling the package with the oxygen containing protective gas.

7. A method for sealing a product in a package having a sealing seam, comprising:
   providing an oxygen containing protective gas having an oxygen content greater than 21% to fill the package;
   providing an inert gas around the sealing seam of the package; and
   heating material of the package at the sealing seam for fusing together said material to close the package.

* * * * *